US012313986B2

(12) United States Patent
Luke et al.

(10) Patent No.: US 12,313,986 B2
(45) Date of Patent: May 27, 2025

(54) TONER TRANSFER MODULATORS

(71) Applicant: Hewlett-Packard Development Company, L.P., Spring, TX (US)

(72) Inventors: Jeffrey Harold Luke, Boise, ID (US); Justin D. Pettingill, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/571,713

(22) PCT Filed: Jul. 9, 2021

(86) PCT No.: PCT/US2021/041018
§ 371 (c)(1),
(2) Date: Dec. 18, 2023

(87) PCT Pub. No.: WO2023/282909
PCT Pub. Date: Jan. 12, 2023

(65) Prior Publication Data
US 2024/0288794 A1 Aug. 29, 2024

(51) Int. Cl.
*G03G 15/08* (2006.01)
*G03G 15/00* (2006.01)

(52) U.S. Cl.
CPC ..... *G03G 15/0813* (2013.01); *G03G 15/0812* (2013.01); *G03G 15/5054* (2013.01)

(58) Field of Classification Search
CPC ........... G03G 15/0813; G03G 15/0812; G03G 15/5054; G03G 15/0435; G03G 15/169; G03G 15/04036; G03G 21/1821; G03G 21/1832; G03G 21/1814
See application file for complete search history.

(56) References Cited

U.S. PATENT DOCUMENTS 4,087,171 A 5/1978 Yano
4,750,015 A 6/1988 Ogura et al.
4,754,301 A * 6/1988 Kasamura .......... G03G 15/0898 399/207
6,473,155 B1 10/2002 Kim
6,980,758 B2 12/2005 Murayama et al.
8,249,485 B2 8/2012 Horikawa et al.
(Continued)

FOREIGN PATENT DOCUMENTS

JP 61-185763 A 8/1986
JP 09-197746 A 7/1997
(Continued)

*Primary Examiner* — Sandra Brase
(74) *Attorney, Agent, or Firm* — Foley & Lardner LLP

(57) ABSTRACT

An apparatus includes a developer and a moveable support that is moveable in response to actuation by an image forming device. The apparatus further includes a toner transfer modulator on the moveable support, the toner transfer modulator moveable with the moveable support between different positions to differently affect transfer of a toner to a photoreceptor or a transfer member, where the moveable support is to move the toner transfer modulator to a first position to disrupt the transfer of the toner to the photoreceptor or the transfer member during an image forming operation of the image forming device.

15 Claims, 7 Drawing Sheets

(56) References Cited

U.S. PATENT DOCUMENTS

| | | | | |
|---|---|---|---|---|
| 8,670,690 | B2 | 3/2014 | Jang et al. | |
| 9,804,515 | B2 | 10/2017 | Sugiura et al. | |
| 9,804,560 | B2 | 10/2017 | Sato et al. | |
| 10,228,652 | B2 | 3/2019 | Sato et al. | |
| 10,564,568 | B2 | 2/2020 | Jung et al. | |
| 10,678,185 | B2 | 6/2020 | Uneme et al. | |
| 10,712,708 | B2 | 7/2020 | Sato et al. | |
| 2005/0069342 | A1 | 3/2005 | Kanno et al. | |
| 2007/0212128 | A1 | 9/2007 | Asakura et al. | |
| 2009/0041513 | A1 | 2/2009 | Someya et al. | |
| 2010/0183335 | A1* | 7/2010 | Matsuo | G03G 15/04072<br>355/71 |
| 2010/0247144 | A1 | 9/2010 | Kaneyama et al. | |
| 2010/0272466 | A1* | 10/2010 | Iikura | G03G 21/1832<br>399/110 |
| 2018/0267459 | A1* | 9/2018 | Sato | G03G 21/1821 |
| 2019/0137904 | A1* | 5/2019 | Jung | G03G 21/1832 |
| 2021/0405554 | A1* | 12/2021 | Sato | G03G 21/1821 |

FOREIGN PATENT DOCUMENTS

| | | | |
|---|---|---|---|
| JP | 2001-337511 | A | 12/2001 |
| JP | 2007-156275 | A | 6/2007 |
| JP | 2019-191553 | A | 10/2019 |

* cited by examiner

TONER TRANSFER MODULATORS

CROSS-REFERENCE TO RELATED APPLICATIONS

This application is a U.S. National Stage Patent Application under 35 U.S.C. § 371 of PCT/US2021/041018, filed Jul. 9, 2021, which is hereby incorporated by reference in its entirety.

BACKGROUND

A printing device can deliver a print material to a print medium to form an image on the print medium. In some examples, a printing device can be an electrophotographic printing device that supplies a toner (which is a type of print material) to an electrostatic latent image formed on a photoreceptor to form a visible toner image on the photoreceptor. The electrophotographic printing device transfers the toner image to a print medium, and then fixes the transferred toner image to the print medium, to form an image on the print medium.

BRIEF DESCRIPTION OF THE DRAWINGS

Some implementations of the present disclosure are described with respect to the following figures.

Figure 1B:
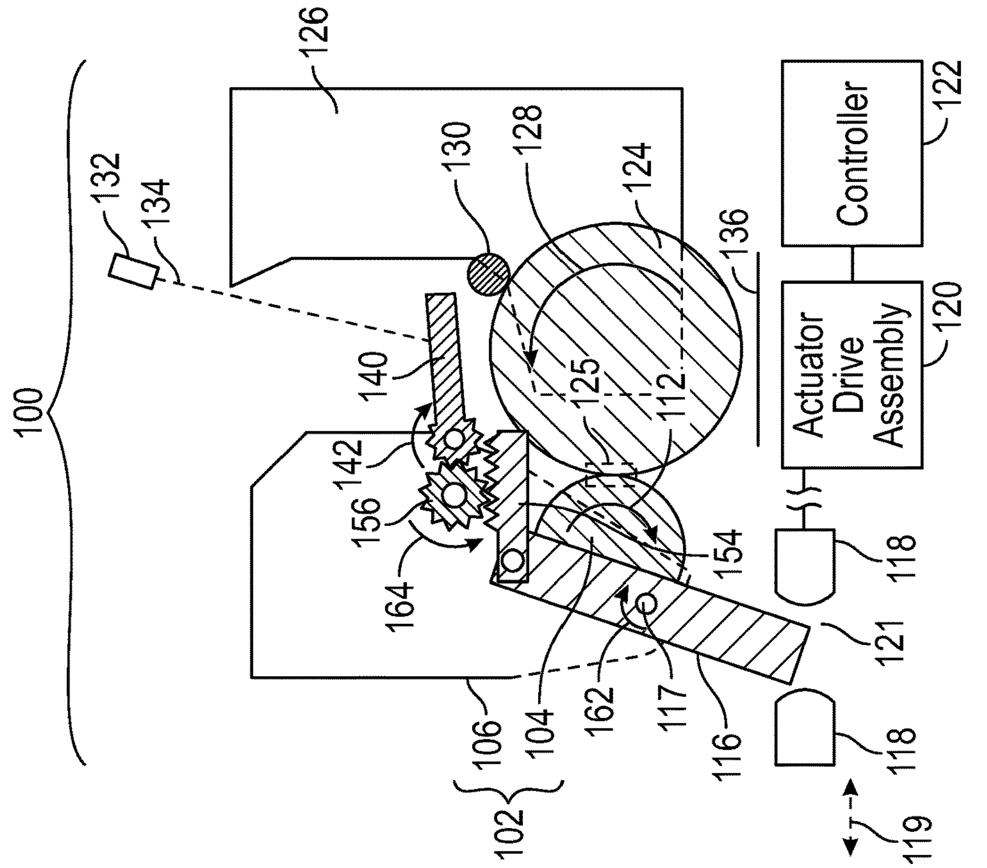
FIGS. 1A-1B, 2A-2C, and 3A-3C are schematic diagrams of a portions of image forming devices according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An image forming device such as an electrophotographic printing device can employ a photoreceptor on which an electrostatic latent image is formed, for use in transferring an image to a target medium (e.g., a print medium such as a paper substrate or a substrate of another material). The photoreceptor can be in the form of a photosensitive drum that includes a cylindrical tubular structure and a photosensitive layer on the cylindrical tubular structure.

A charging element can be used to charge a surface of the photosensitive drum to a uniform electrical potential (e.g., a negative electrical potential). In some examples, the charging element can include a charging roller. In other examples, a charging element can be in the form of a corona charger that can charge the surface of the photosensitive drum to a uniform electrical potential without making physical contact with the surface of the photosensitive drum.

A light source (e.g., a laser source, light emitting diode(s) (LEDs), etc.) can be activated by a controller of the image forming device to irradiate selected portions of the charged surface of the photosensitive drum, to form an electrostatic latent image on the photosensitive drum.

A developing device in the image forming device includes a developer (e.g., a developing roller) onto which a developing agent including an electrically charged toner is adhered. During operation of the image forming device, as the developing roller rotates relative to the photosensitive drum (which also rotates in the opposite rotational direction of the developing roller), the developing agent on the developing roller is conveyed to a supply region facing the photosensitive drum. In this supply region, a layer of toner adhered to the surface of the developing roller can be transferred to the photosensitive layer of the photosensitive drum on which the electrostatic latent image has been formed, which develops the electrostatic latent image on the surface of the photosensitive drum to form a visible toner image on the photosensitive drum.

In some examples, the developing device including the developing roller can be part of a cartridge that is removably inserted into the image forming device. The cartridge can include a reservoir containing a toner, and the toner in the reservoir can be transferred to the developing roller.

When the cartridge is inserted into an image forming device, the developing roller is energized by applying a bias voltage to the outer surface of the developing roller. The electrically charged toner in the reservoir of the cartridge is electrically attracted by the bias voltage to the outer surface of the developing roller.

In some cases, the developing roller is continually energized (the bias voltage is continually applied to the developing roller) so long as the cartridge remains inserted in the image forming device and the image forming device is in an active state (e.g., the image forming device is not powered off or in a sleep mode). When the developing roller is energized, rotation of the developing roller continues to attract toner to the developing roller, and in conjunction with a rotation of the photosensitive drum, the toner is transferred to the photosensitive drum.

In some examples, an ability to selectively control whether or not toner can be transferred from the developing roller to the photosensitive drum during an active operation of an image forming device is not available. As a result, a user of the image forming device is not provided with the flexibility to selectively disrupt the transfer of toner from the developing roller to the photosensitive drum while the image forming device is active, such as during an image forming operation (e.g., performed as part of a maintenance of the image forming device, or a test of the image forming device, or during normal use by a customer of the image forming device). The ability to selectively disrupt a transfer of the toner from the developing roller to the photosensitive drum can be useful for various purposes, such as to test the cartridge or the image forming device, to perform maintenance of the cartridge or the image forming device, to check a status of the cartridge or the image forming device, and so forth.

In accordance with some implementations of the present disclosure, techniques or mechanisms are provided to selectively disrupt a transfer of toner from a developer (e.g., a developing roller) to a photoreceptor (e.g., a photosensitive drum) during an image forming operation of an image forming device (e.g., during a print operation), or to disrupt the toner transferred to the photoreceptor or a transfer member (e.g., an intermediate transfer member). The selective disruption uses a toner transfer modulator in the cartridge. The image forming operation during which the selective disruption of toner transfer can occur can be part of a test operation (e.g., to test a cartridge or the image forming device), a maintenance operation (to perform maintenance of the cartridge or the image forming device, a status check operation (to check a status of the cartridge or the image forming device), a normal image forming operation in which a target image according to image data is to formed on a target medium.

In some examples, the toner transfer modulator includes a light shutter that is moveable between different positions, where in a blocking position the light shutter blocks light emitted by a light source from reaching the outer surface of the photosensitive drum during the image forming operation, and where a non-blocking position the light shutter allows light emitted by the light source to reach the outer surface of the photosensitive drum. In the blocking position the light shutter is to block the light of the light source from reaching an entirety or a specified portion of an image forming surface of the photosensitive drum.

In further examples, the toner transfer modulator includes a diverter that when in an engaged position redirects a portion (a partial segment or an entirety) of the toner off a surface of the photosensitive drum or transfer member (e.g., an intermediate transfer member such as an intermediate transfer belt or another type of intermediate transfer member) after transfer of the toner to the photosensitive drum or transfer member.

More generally, a "toner transfer modulator" can refer to any mechanism that has multiple states that selectively affect an amount or location of a portion (a partial segment or an entirety) of a toner transferred to a photoreceptor or a transfer member. The multiple states include a first state in which the mechanism allows the toner to be transferred to the photoreceptor or transfer member in an intended manner, such as during a normal use of an image forming device (e.g., during a print operation to print an image according to received image data onto a print medium). The multiple states further include a second state in which the mechanism causes a disruption of the transfer of the toner to the photoreceptor or the transfer member, such as by: 1) modifying a transfer the toner from the developer to the photoreceptor (by disabling the transfer of the toner from the developer to the photoreceptor, or by changing the amount of the toner transferred from the developer to the photoreceptor that deviates from an expected amount based on image data representing an image to be formed on a target medium), or 2) causing a part or an entirety of the toner transferred onto the photoreceptor or the transfer member to be diverted from one portion of the photoreceptor or the transfer member to another portion of the photoreceptor or the transfer member or to a separate toner receiver (e.g., a container to receive the diverted toner) or another location.

In the ensuing discussion, reference is made to examples in which a developer is in the form of a developing roller, and a photoreceptor is in the form of a photosensitive drum. In other examples, other types of developers and/or photoreceptors can be employed.

Figure 1A:
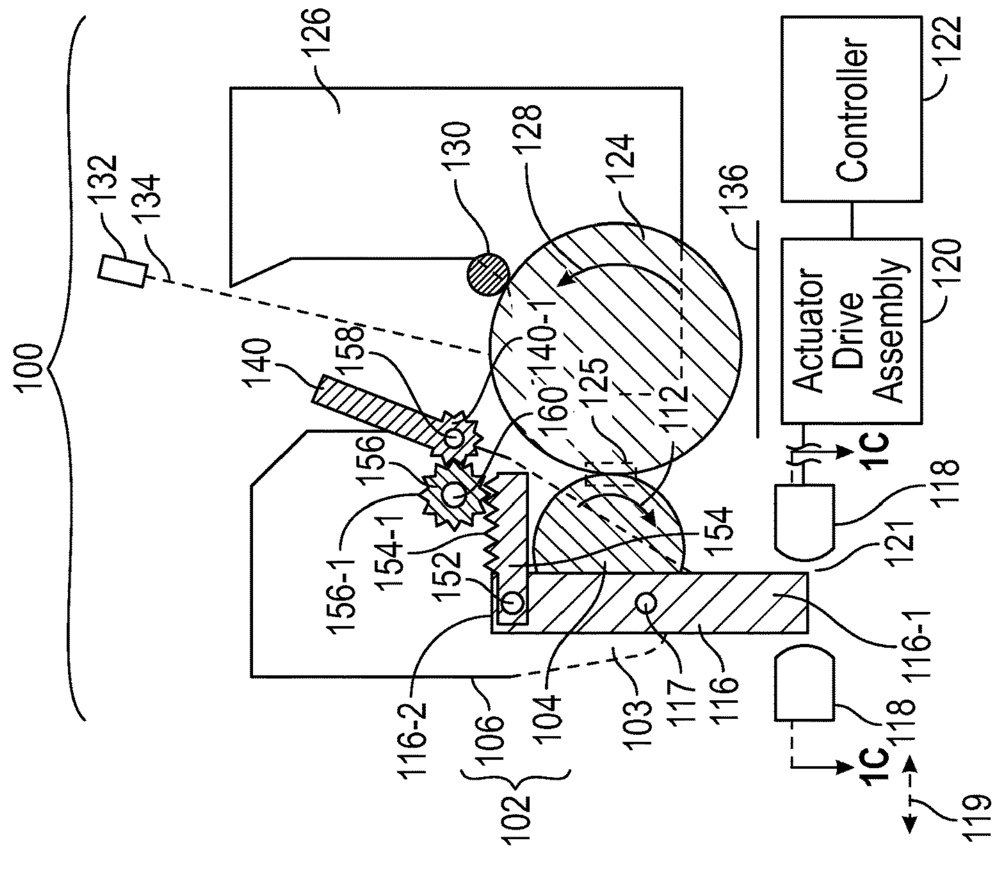

FIGS. 1A-1B illustrate portions of an image forming device 100 including an actuator assembly at respective different states to control a position of a light shutter 140, in accordance with some implementations of the present disclosure. Note that some portions of the image forming device 100 are not shown in FIGS. 1A and 1B for brevity.

Also, although a specific example actuator assembly for the light shutter 140 is depicted in FIGS. 1A-1B, it is noted that in other examples, actuator assemblies for the light shutter 140 can have different arrangements.

The image forming device 100 includes a developing device 102 that includes a developing roller 104, a reservoir 106, and other components (not shown). The reservoir 106 contains a developing agent that includes an electrically charged toner. For example, the developing agent can include the electrically charged toner, a mixture of the electrically charged toner and a liquid carrier, or the toner with carrier particles.

During an image forming operation of the image forming device 100, a bias voltage can be applied to the developing roller 104. The bias voltage is supplied from a voltage source (not shown) of the image forming device 100.

In some examples, a regulator (not shown) of the developing device 102 regulates a thickness of a toner that is adhered to the outer surface of the developing roller 104. The regulator can be in the form of a regulating blade or another type of regulator. A tip of the regulating blade can come into contact or close proximity with the outer surface of the developing roller 104. As the developing roller 104 rotates in a first rotational direction 112, the electrically charged toner is transferred from the reservoir 106 to the outer surface of the developing roller 104 (the electrically charged toner is attracted to the outer surface of the developing roller 104 by the bias voltage applied to the developing roller 104). The regulator sets the thickness of the toner on the developing roller 104 to be uniform as the developing roller 104 rotates. In some examples, the regulator can also be set to the bias voltage from the voltage source.

In FIGS. 1A-1B, the actuator assembly for the light shutter 140 includes an actuator 118, a lever 116, a ratchet 154, and a gear 156.

In FIG. 1A, the lever 116 is at a first pivot position. In FIG. 1B, the lever 116 has been moved to a second pivot position that is different from the first pivot position. The lever 116 is pivotably mounted at a pivot point 117 to a housing 103 of the developing device 102. The lever 116 has a first end portion 116-1 that is received in a receptacle 121 of an actuator 118. A second end portion 116-2 of the lever 116 is pivotably connected at a pivot connection 152 to a first end portion of the ratchet 154.

Figure 1C:
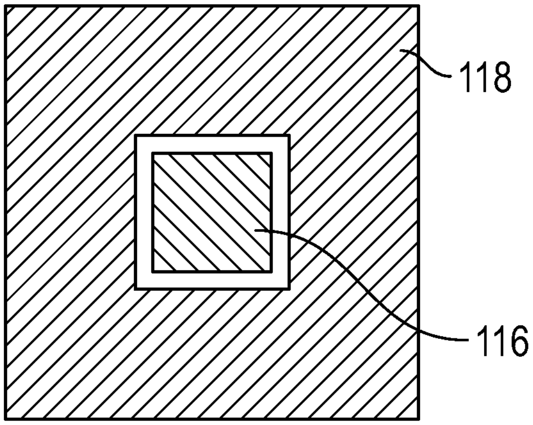
FIG. 1C is a cross-sectional view of an actuator of an actuator assembly, according to some examples.

The actuator 118 is movable along an axis 119, in the left and right directions in the view of FIGS. 1A-1B. Movement of the actuator 118 along the axis 119 causes a rotational movement of the lever 116, as depicted in in FIGS. 1A-1B. The rotational movement of the lever 116 results in a rotational motion of the light shutter 140. FIG. 1C shows a cross-sectional view of the actuator 118 taken along section 1C-1C in FIG. 1A. The actuator 118 is generally ring-shaped (a square ring in the example shown in FIG. 1C, although other shapes can be used in other examples). The opening in the center corresponds to the receptacle 121 of FIGS. 1A-1B. In other examples, the actuator 118 does not surround all sides of the lever 116.

The actuator 118 is moved by a drive assembly 120 of the image forming device 100. In some examples, the drive assembly 120 can include a motor, a solenoid mechanism, an assembly of gears, or any other type of assembly that can impart motion on the actuator 118. The drive assembly 120 can be controlled by a controller 122 of the image forming device 100. In some examples, the controller 122 can control image forming operations and/or other operations of the image forming device 100.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In examples according to FIGS. 1A-1B, the actuator 118 slides left and right (in the view of FIGS. 1A-1B) along the axis 119 in response to being driven by the actuator drive assembly 120 under control of the controller 122. In other examples, the actuator 118 can be pivoted, rotated, or caused to have another type of motion based on being driven by the actuator drive assembly 120 under control of the controller 122.

A photosensitive drum 124 is located in close proximity with the developing roller 104 in a supply region 125 where the toner is to be transferred from the developing roller 104 to the photosensitive drum 124. In some examples, an outer surface of the developing roller 104 can make physical contact with the outer surface of the photosensitive drum 124. In other examples, the outer surface of the developing roller 104 is in sufficiently close proximity to the outer surface of the photosensitive drum 124 such the toner that is on the outer surface of the developing roller 104 can be transferred to the outer surface of the photosensitive drum 124 (or more specifically, to the outer surface of a photosensitive layer of the photosensitive drum 124). In some examples, the photosensitive drum 124 is rotatably supported by a support 126.

In some examples, the developing device 102, the actuator assembly (that includes the actuator 118, the lever 116, the ratchet 154, and the gear 156), the photosensitive drum 124, and the light shutter 140 can be part of a removable cartridge that is removably mounted in the image forming device 100. The cartridge has a housing in which or to which the developing device 102, the actuator assembly, the photosensitive drum 124, and the light shutter 140 are located or attached. The housing of the cartridge can include the support 126, the housing 103 of the developing device 102, and other housing segments (not shown).

During an image forming operation, the photosensitive drum 124 is rotated in a second rotational direction 128, which is opposite the first rotational direction 112 of the developing roller 104. For example, the first rotational direction 112 is a clockwise direction, while the second rotational direction 128 is a counterclockwise direction (or vice versa).

As further shown in FIG. 1A, an imaging charging element 130 when energized is used to charge the outer surface of the photosensitive drum 124 to a uniform electric potential. The imaging charging element 130 can include a charging roller or a corona charger, according to some examples.

The image forming device 100 further includes a light source 132 to irradiate selected portions of the electrically charged outer surface of the photosensitive drum 124 with light 134. The light 134 emitted from the light source 132 is modulated according to image data received by the controller 122. The image data defines the image to be formed on a target medium 136, such as a print substrate. Note that the light source 132 is external of the cartridge and is part of the image forming device 100.

In the position of the lever 116 shown in FIG. 1A, the light shutter 140 is in a first shutter position (non-blocking position) to not block the light 134 emitted from the light source 132, such that the light 134 can reach the outer surface of the photosensitive drum 124.

The light shutter 140 can be in the form of a panel that can pivot between the first shutter position shown in FIG. 1A to the second shutter position shown in FIG. 1B. In other examples, the light shutter 140 can have a different shape.

As shown in FIG. 1B, when the light shutter 140 has pivoted along a rotational direction 142 from the first shutter position to the second shutter position, the light 134 emitted by the light source 132 is blocked by the light shutter 140, such that the light 134 is unable to reach a portion of or an entirety of the outer surface of the photosensitive drum 124.

Each portion of the electrically charged outer surface of the photosensitive drum 124 irradiated with the light 134 will have the portion's electric potential changed (from the electric potential charged by the imaging charging element 130). In first examples, the selected portions irradiated with the light 134 correspond to respective portions of an image to be formed on the target medium 136. In such first examples, toner is transferred from the developing roller 104 to the irradiated selected portions where the respective portions of the image are to be formed on the target medium. In the first examples, the toner is transferred to locations of the electrostatic latent image formed on the outer surface of the photosensitive drum 124.

In second examples, the selected portions irradiated with the light 134 correspond to respective portions where an image is not to be formed on the target medium 136. In such second examples, toner is transferred from the developing roller 104 to remaining portions of the outer surface of the photosensitive drum 124 where the light 134 has not irradiated. In the second examples, the toner is transferred to locations outside of the electrostatic latent image formed on the outer surface of the photosensitive drum 124.

The irradiation of the outer surface of the photosensitive drum 124 with the light 134 forms an electrostatic latent image on the outer surface of the photosensitive drum 124. Toner is transferred from the developing roller 104 to the outer surface of the photosensitive drum 124 based on the electrostatic latent image, to develop the electrostatic latent image to form a visible toner image on the outer surface of the photosensitive drum 124.

The toner image on the photosensitive drum 124 can then be transferred to the target medium 136, either directly by the photosensitive drum 124 or indirectly through an intermediate transfer member, such as an intermediate transfer belt, an intermediate roller, and so forth. The intermediate transfer member is not depicted in FIGS. 1A-1B for brevity.

During an image forming operation of the image forming device 100, if the light shutter 140 has been actuated to the second shutter position (blocking position) shown in FIG. 1B, then the outer surface of the photosensitive drum 124 would remain at the uniform electric potential charged by the imaging charging element 130. An electrostatic latent image based on the radiation of the light 134 from the light source 132 would not be produced on the outer surface of the photosensitive drum 124 when the light shutter 140 blocks the light 134 from the outer surface of the photosensitive drum 124.

As a result, in the first examples noted above where the toner is to be transferred from the developing roller 104 to the photosensitive drum 124 at locations of the electrostatic latent image, the blocking of the light 134 from the outer surface of the photosensitive drum 124 would disable the toner transfer from the developing roller 104 to the outer surface of the photosensitive drum 124. Because there is no light irradiation of the uniform electric potential formed on the surface of the photosensitive drum 124 by the imaging charging element 130, the outer surface of the photosensitive drum 124 at the uniform electric potential to prevent the transfer of the toner from the developing roller 104 to the photosensitive drum 124.

On the other hand, in the second examples where the toner is transferred to locations outside of the electrostatic latent image formed on the outer surface of the photosensitive drum 124, the blocking of the light 134 from the outer surface of the photosensitive drum 124 by the light shutter 140 would cause the toner to be transferred from the developing roller 104 to the entire outer surface of the photosensitive drum 124 capable of receiving the toner from the developing roller 104 in the supply region 125.

More generally, when the light 134 from the light source 132 is not blocked by the light shutter 140 when the light shutter is in the first shutter position of FIG. 1A, toner transfer from the developing roller 104 to the photosensitive drum 124 can occur in the normal manner according to an electrostatic latent image formed on the outer surface of the photosensitive drum 124 according to image data received by the controller 122. However, when the light 134 from the light source 132 is blocked by the light shutter 140 when the light shutter is in the second shutter position of FIG. 1B, toner transfer from the developing roller 104 to the photosensitive drum 124 is disrupted (either no toner is transferred or toner is transferred to the entire outer surface of the photosensitive drum 124 capable of receiving the toner from the developing roller 104 in the supply region 125).

The following discusses further details of other components of the actuator assembly.

The ratchet 154 has a teeth profile 154-1 that is engageable by a corresponding teeth profile 156-1 of the gear 156. The gear 156 is rotationally attached to the housing 103 of the developing device 102 at a pivot point 160.

The teeth profile 156-1 of the gear 156 is also engageable with a teeth profile 140-1 of a pivoting portion of the light shutter 140 that is pivotably attached at a pivot point 158 to the housing 103 of the developing device 102.

When the actuator 118 is shifted left in the view of FIGS. 1A-1B, the lever 116 is caused to rotate in a rotational direction 162 (FIG. 1B) at the pivot point 117, which causes the ratchet 154 to move to the right in the view of FIG. 1B. Movement of the ratchet 154 to the right in turn causes a rotation of the gear 156 in the rotational direction 164 (FIG. 1B), which is opposite the rotational direction 162). The rotation of the gear 156 in the rotational direction 164 causes the light shutter 140 to rotate in the rotational direction 142 (which is opposite the rotational direction 164), to rotate the light shutter 140 to the second shutter position shown in FIG. 1B.

Figure 2B:
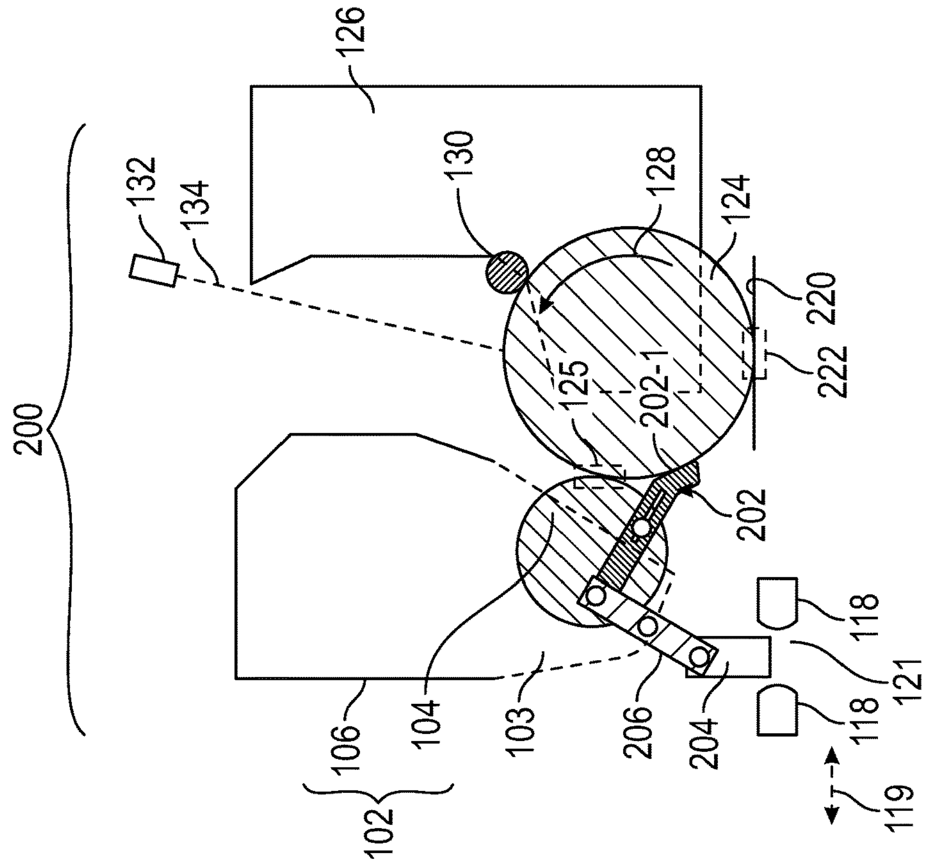
Figure 2A:
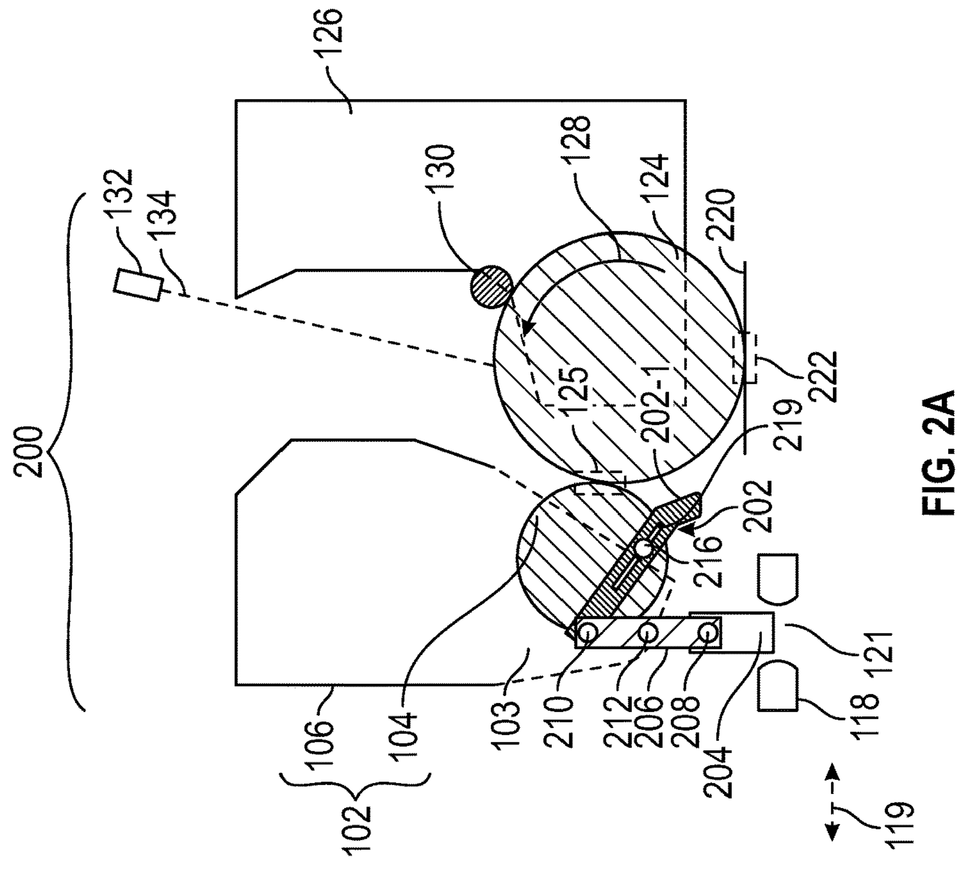
Figure 2C:
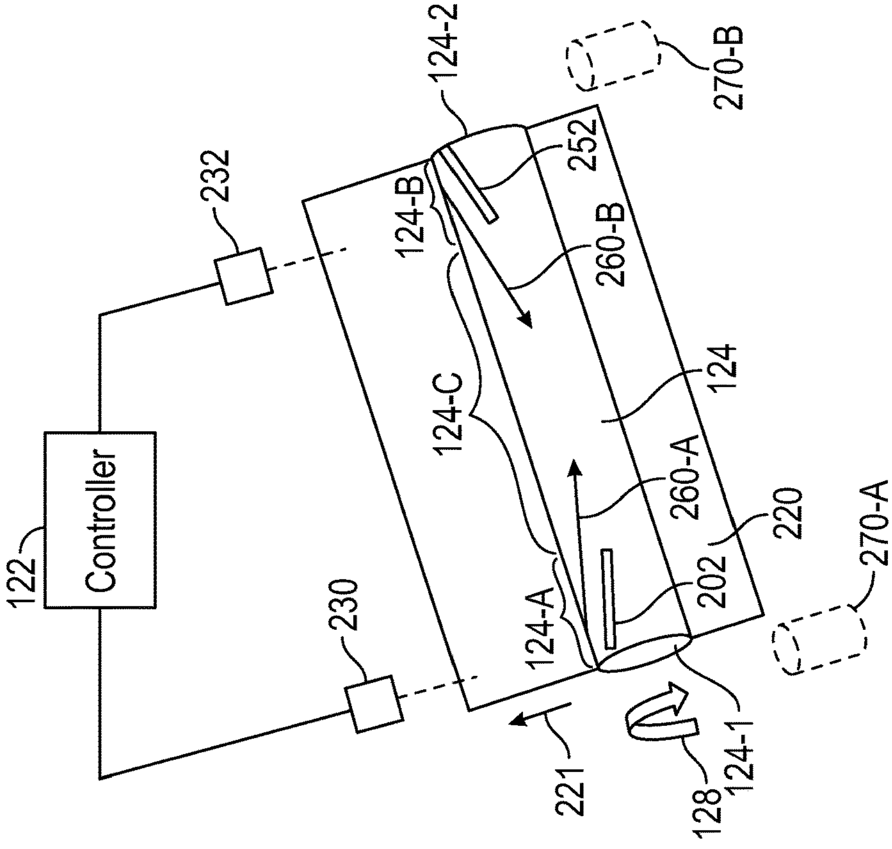

FIGS. 2A-2C show components of an image forming device 200 that employs a diverter 202 to perform disruption of the toner transferred to the outer surface of the photosensitive drum 124.

Components of the image forming device 200 similar to those of the image forming device 100 of FIGS. 1A-1B share the same reference numerals.

In FIGS. 2A-2C, the actuator drive assembly 120 and the controller 122 that are part of the image forming device 200 are not shown for better clarity. The actuator drive assembly 120 and the controller 122 are able to control movement of the actuator 118 along the axis 119 similar to the control of the actuator 118 discussed in connection with FIGS. 1A-1B.

In FIG. 2A, the diverter 202 is disengaged from the outer surface of the photosensitive drum 124. In FIG. 2A, an engagement surface 202-1 of the diverter 202 is spaced apart from the outer surface of the photosensitive drum 124.

In FIG. 2B, the diverter 202 has been actuated to an engaged position in which the engagement surface 202-1 of the diverter 202 is physically engaged (contacted) with the outer surface of the photosensitive drum 124.

In examples according to FIGS. 2A-2B, an actuator assembly to move the diverter 202 between the disengaged position of FIG. 2A and the engaged position of FIG. 2B includes an engagement member 204 and a lever 206. In other examples, other arrangements of the actuator assembly can be used.

The engagement member 204 is received in the receptacle 121 of the actuator 118. The engagement member 204 is pivotally attached to a lever 206 at a pivot point 208. A first end portion of the lever 206 is pivotally attached to the engagement member 204. A second end portion of the lever 206 is pivotally connected to a first end portion of the diverter 202 at a pivot point 210. The engagement surface 202-1 of the diverter 202 is at the second end portion of the diverter 202.

The lever 206 can rotate about a pivot point 212, which is attached to the housing 103 of the developing device 102.

The pivoting connection of the engagement member 204 and the lever 206 allows for the lever 206 to pivot relative to the engagement member 204 when the engagement member 204 is moved along the axis 119 by the actuator 118.

The pivoting connection of the lever 206 to the diverter 202 at the pivot point 210 allows for pivoting of the diverter 202 relative to the lever 206 in response to a rotation of the lever 206 at the pivot point 212.

In examples according to FIGS. 2A-2B, the diverter 202 has a longitudinal slot 219 along which a pin 216 is slidable as the diverter 202 pivots with respect to the lever 206 at the pivot point 210. The sliding motion of the pin 216 in the longitudinal slot 219 can cause the diverter 202 to advance from the disengaged position of FIG. 2A towards the outer surface of the photosensitive drum 124.

When the diverter 202 is physically engaged with the outer surface of the photosensitive drum 124, as shown in FIG. 2B, the diverter 202 is able to redirect a portion of the toner that has been transferred in the supply region 125 from the developing roller 104 to the photosensitive drum 124. Note that the diverter 202 in the example of FIGS. 2A-2B is downstream of the supply region 125 in the rotational direction 128 of the photosensitive drum 124.

FIGS. 2A-2B are schematic side views of the components shown in those figures. FIG. 2C is a front schematic view of the photosensitive drum 124 and an intermediate transfer member 220, such as an intermediate transfer belt. During operation, the intermediate transfer member 220 moves along a direction 221 (FIG. 2C). In examples according to FIGS. 2A-2C, the toner image transferred onto the outer surface of the photosensitive drum 124 is transferred to the intermediate transfer member 220. As depicted in the FIGS. 2A-2B, the outer surface of the photosensitive drum 124 is in close proximity (in contact with or in sufficiently close proximity to allow for transfer of toner) with the upper surface of the intermediate transfer member 220. The toner image on the intermediate transfer member 220 is then transferred in a transfer region 222 to a target medium (not shown in FIGS. 2A-2C), such as a print medium.

The side views of FIGS. 2A-2B show one diverter 202. In some examples, there can be multiple diverters, such as shown in FIG. 2C. In FIG. 2C, the diverter 202 is proximate the left side portion of the photosensitive drum 124, and another diverter 252 is proximate the right side portion of the photosensitive drum 124. The diverter 252 can be actuated between a disengaged position and an engaged position using an actuator assembly that is similar to the actuator assembly used to actuate the diverter 202.

The diverter 202 is to engage a left segment 124-A of the outer surface of the photosensitive drum 124, and the diverter 252 is to engage a right segment 124-B of the outer surface of the photosensitive drum 124. As shown in FIG. 2C, the diverter 202 is angled downwardly from a first end 124-1 of the photosensitive drum 124 towards a central segment 124-C of the photosensitive drum 124. Similarly, the diverter 252 is angled downwardly from the second end 124-2 of the photosensitive drum 124 towards the central segment 124-C of the photosensitive drum 124.

The angled arrangements of the diverters 202 and 252 causes redirection of the toner portions on photosensitive drum segments 124-A and 124-B, respectively, towards the central segment 124-C of the photosensitive drum 124 (along respective directions 260-A and 260-B. After operation of the diverters 202 and 252, the toner portions on the photosensitive drum segments 124-A and 124-B are removed and redirected to the central segment 124-C.

In other examples, the diverters 202 and 252 can divert toner portions on the photosensitive drum segments 124-A and 124-B towards the respective first and second ends 124-1 and 124-2 to fall off the outer surface of the photosensitive drum 124. In such examples, the diverters 202 and 252 would be angled downwardly from the central segment 124-C towards the respective first and second ends 124-1 and 124-2. Containers 270-A and 270-B can be positioned to receive the toner portions diverted by the diverters 202 and 252 off the photosensitive drum segments 124-A and 124-B. In other examples, the diverters 202 and 252 can redirect the toner portions off the photosensitive drum segments 124-A and 124-B to another location.

As further shown in FIG. 2C, sensors (e.g., colorimeters, image sensors, etc.) 230 and 232 are arranged to sense the presence of toner on the photosensitive drum segments 124-A and 124-B. As an example, the toner portions if transferred to the photosensitive drum segments 124-A and 124-B would have a specified color (e.g., black or a different color). In such examples, the sensors 230 and 232 can measure the color of the photosensitive drum segments 124-A and 124-B, and provide the measurement data to the controller 122 over an electrical connection.

The controller 122 can process the measurement data from the sensors 230 and 232 to determine whether toner is present on the photosensitive drum segments 124-A and 124-B, for the purpose of ascertaining whether the diverters 202 and 252 have been actuated to the engaged position.

Lack of toner on the photosensitive drum segments 124-A and 124-B provides an indication that the diverters 202 and 252 have been engaged with the outer surface of the photosensitive drum 124 and have diverted toner portions away from the photosensitive drum segments 124-A and 124-B to at different location, such as the central segment 124-C or respective containers.

The photosensitive drum segments 124-A and 124-B are within the ranges of the respective sensors 230 and 232. However, the central segment 124-C or a location off of the photosensitive drum 124 is not within a range of any sensor that detects presence of a toner on the photosensitive drum 124.

In other examples, diverters similar to the diverters 202 and 252 can be used to redirect portions of the toner on the outer surface of the developing roller 104 to other locations.

Figure 3A:
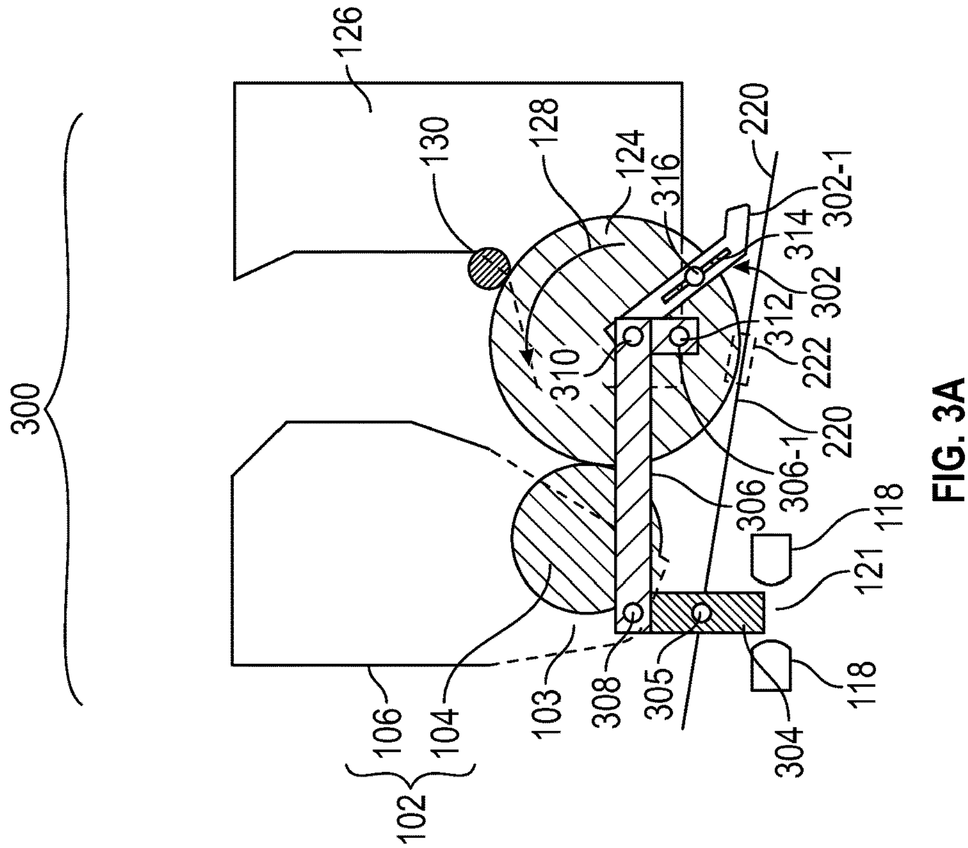
Figure 3C:
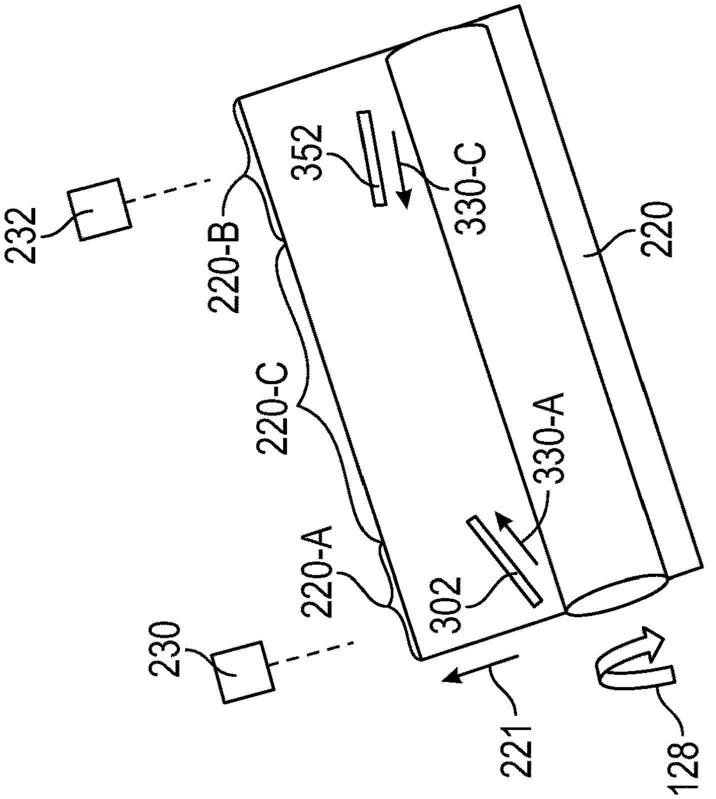
Figure 3B:
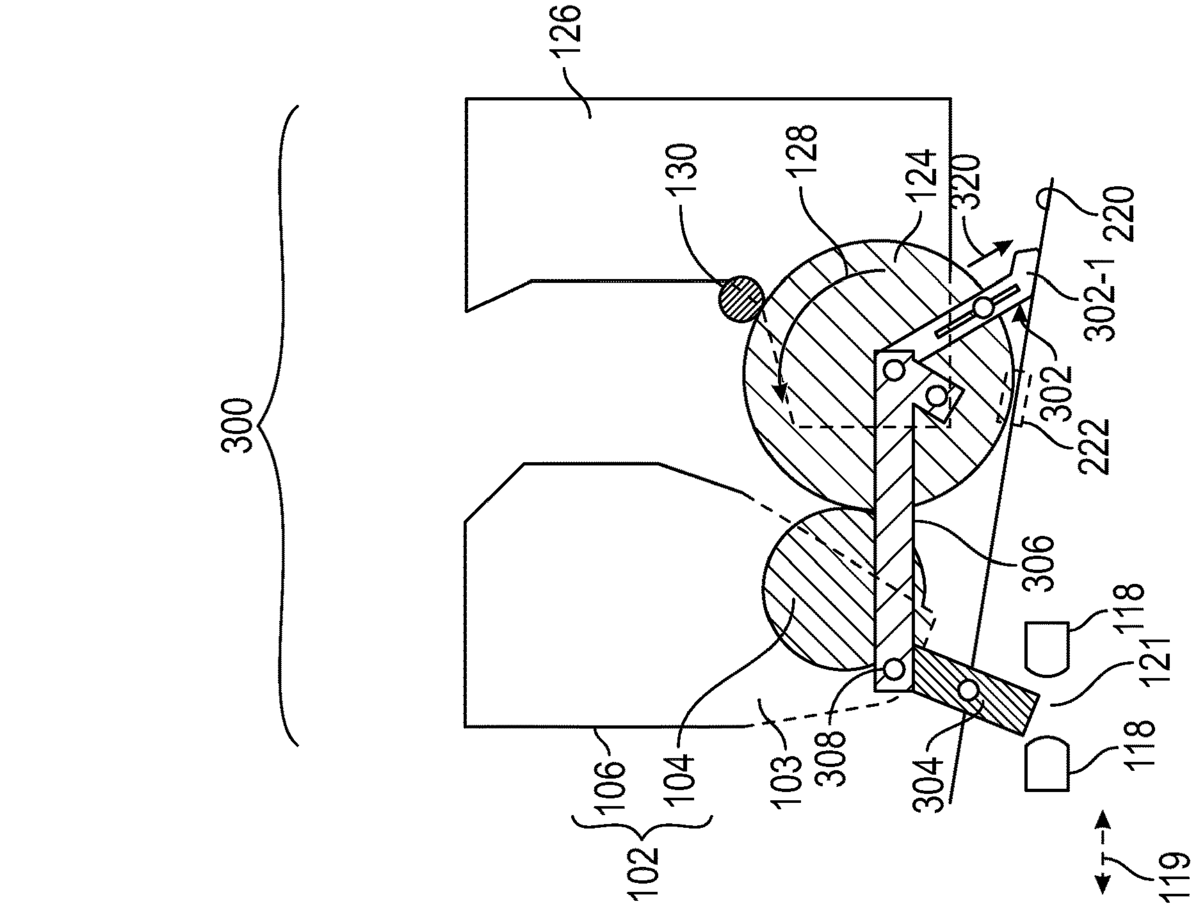

FIGS. 3A-3C show a different example of an image forming device 300 in which diverters 302 and 352 are used to redirect toner portions have been transferred onto the surface of the intermediate transfer member 220 from intermediate transfer member segments 220-A and 220-B to a different location, such as a central segment 220-C of the intermediate transfer member 220.

Components of the image forming device 300 similar to those of the image forming device 100 of FIGS. 1A-1B share the same reference numerals.

In FIGS. 3A-3C, the actuator drive assembly 120 and the controller 122 that are part of the image forming device 300 are not shown for better clarity. The actuator drive assembly 120 and the controller 122 are able to control movement of the actuator 118 along the axis 119 similar to the control of the actuator 118 discussed in connection with FIGS. 1A-1B.

In FIGS. 3A-3B, the diverter 302 is actuated using an actuator assembly that includes an engagement member 304 and a lever 306. The engagement member 304 is pivotally connected to a first end portion of the lever 306 at a pivot point 308. The engagement member 304 is also pivotally connected to the housing 103 of the developer device 102 at a pivot point 305.

The second end portion of the lever 306 is pivotally connected to a first end portion of the diverter 302 at a pivot point 310. The second end portion of the diverter 302 includes an engagement surface 302-1 for engaging an upper surface of the intermediate transfer member 220 when the diverter 302 is in the engaged position shown in FIG. 3B.

The lever 306 is generally L-shaped such that a segment 306-1 of the lever 306 is pivotally connected to a housing (e.g., the cartridge housing) at a pivot point 312.

The diverter 302 includes a longitudinal slot 314 in which a pin 316 is slidable in response to pivoting of the lever 306 relative to the diverter 302 at the pivot point 310. As shown in FIG. 3B, movement of the actuator 118 to the left along the axis 119 causes the actuator assembly to actuate the diverter 302 such that the engagement surface 302-1 of the diverter 302 moves in a direction 320 to engage the upper surface of the intermediate transfer member 220.

As shown in FIG. 3C, when the diverters 302 and 352 are engaged with the intermediate transfer member 220, the diverter 302 redirects a toner portion from the intermediate transfer member segment 220-A to the central intermediate transfer member segment 220-C along a direction 330-A, and the diverter 352 redirects a toner portion from the intermediate transfer member segment 220-B to the central intermediate transfer member segment 220-C along a direction 330-C.

The diverter 302 is angled upwardly from a left edge of the intermediate transfer member 220 to the central intermediate transfer member segment 220-C, and the diverter 352 is angled upwardly from a right edge of the intermediate transfer member 220 to the central intermediate transfer member segment 220-C.

Figure 4:
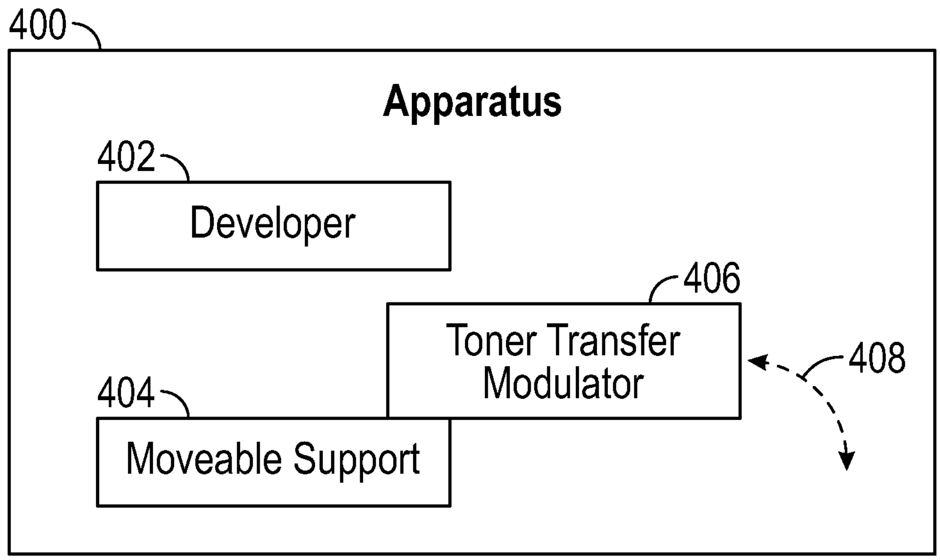
FIG. 4 is a block diagram of an apparatus according to some examples.

FIG. 4 is a block diagram of an apparatus 400 according to some examples. The apparatus 400 may be part of a cartridge containing a toner that is removably inserted into an image forming device, for example.

The apparatus 400 includes a developer 402 (e.g., the developing roller 104), and a moveable support 404 that is moveable in response to actuation by an image forming device. The moveable support 404 can include a portion of the light shutter 140 with the teeth profile 140-1 (FIGS. 1A-1B), the lever 206 (FIGS. 2A-2B), the lever 306 (FIGS. 3A-3B), or any other type of support.

The apparatus 400 includes a toner transfer modulator 406 (e.g., the light shutter 140 of FIGS. 1A-1C, the diverter 202 of FIGS. 2A-2B, the diverter 302 of FIGS. 3A-3C, etc.) on the moveable support 404. The toner transfer modulator 406 is moveable (408) with the moveable support 404 between different positions to differently affect transfer of a toner to a photoreceptor (e.g., the photosensitive drum 124) or a transfer member (e.g., the transfer member 220). The movement (408) of the toner transfer modulator 406 can be a rotation movement, a sliding movement, or any other type of movement. The moveable support 404 can move the toner transfer modulator 406 to a first position to disrupt the transfer of the toner to the photoreceptor or the transfer member during an image forming operation of the image forming device.

The moveable support 404 can move the toner transfer modulator 406 to a second position to allow the normal transfer of the toner to the photoreceptor or a transfer member during a further image forming operation of the image forming device. The "normal transfer" of the toner can refer to a transfer of the toner that is based on a target operation of the image forming device in an absence of interference by the toner transfer modulator 406.

In some examples, the toner transfer modulator 406 includes a light shutter. The first position of the toner transfer modulator 406 corresponds to a blocking position of the light shutter that blocks light of a light source (e.g., 132) from reaching the photoreceptor during the image forming operation. In the blocking position the light shutter is to block the light of the light source from reaching an entirety or a specified portion of an image forming surface of the photoreceptor.

In some examples, the toner transfer modulator 406 includes a diverter (e.g., 202 in FIGS. 2A-2B) to redirect a portion of the toner off a surface of the photoreceptor after transfer of the toner from the developer to the photoreceptor and prior to transfer of the toner from the photoreceptor to the transfer member. The first position of the toner transfer modulator corresponds to an engaged position of the diverter in which the diverter is positioned to physically redirect the portion of the toner off the surface of the photoreceptor.

In some examples, the diverter in the engaged position diverts the portion of the toner from a first part of the surface of the photoreceptor to a location away from the first part of the surface of the photoreceptor, where the location can be a central part of the photoreceptor, or a location off of the photoreceptor.

In further examples, the toner transfer modulator 406 includes a diverter (e.g., 302 in FIGS. 3A-3B) to redirect a portion of the toner off a surface of a transfer member (e.g., 220 in FIGS. 3A-3C) where the toner on the surface of the transfer member was transferred from the photoreceptor to the transfer member.

In additional examples, the toner transfer modulator 406 includes a diverter to redirect a portion of the toner off a surface of the developer after transfer of the toner to the developer and prior to transfer of the toner from the developer to the photoreceptor.

In further examples, any combination of the foregoing can be implemented.

Figure 5:
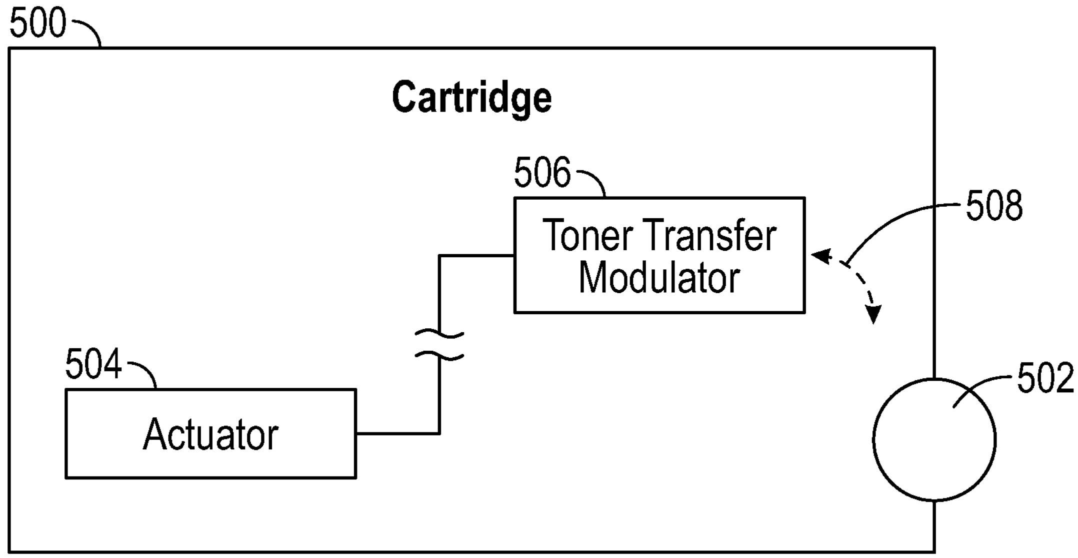
FIG. 5 is a block diagram of a cartridge for an image forming device, according to some examples.

FIG. 5 is a block diagram of a cartridge 500 for an image forming device. The cartridge 500 includes a developing roller 502, and an actuator 504 moveable between different positions by a drive assembly (e.g., 120 in FIGS. 1A-1C) of the image forming device during an image forming operation of the image forming device.

The cartridge 500 includes a toner transfer modulator 506 moveable (at 508), in response to a movement of the actuator 504, in the image forming device between a first position and a second position to control a transfer of a toner to a photoconductive drum (e.g., 124) or a transfer member (e.g., 220).

The toner transfer modulator 506 when in the first position disrupts the transfer of the toner to the photoconductive drum or the transfer member during the image forming operation of the image forming device. The toner transfer modulator 506 when in the second position allows for a normal transfer of the toner to the photoconductive drum or the transfer member during the image forming operation of the image forming device.

Figure 6:
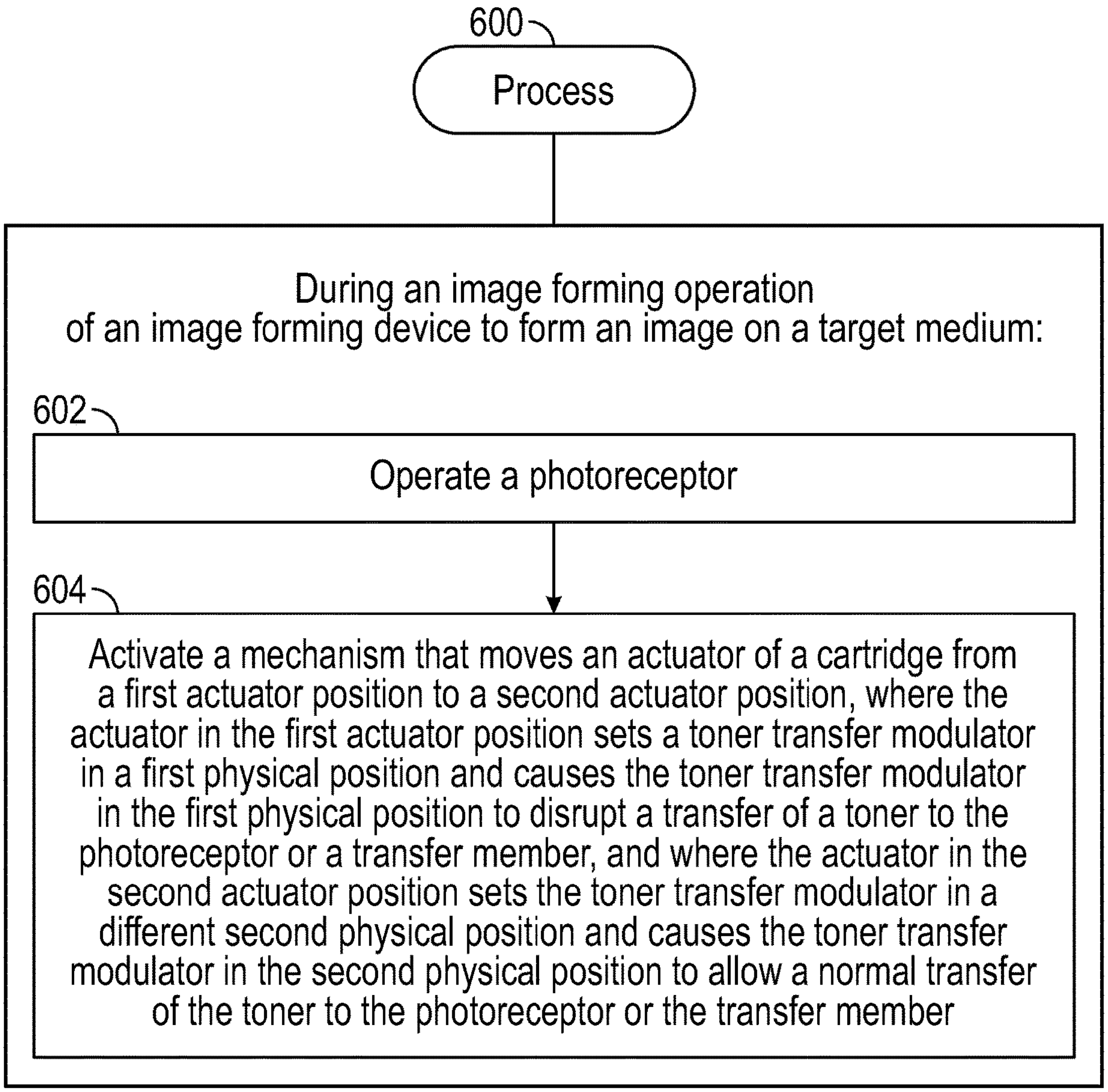
FIG. 6 is a flow diagram of a process according to some examples.

FIG. 6 is a flow diagram of a process 600 according to some examples.

During an image forming operation of an image forming device to form an image on a target medium, the process 600 includes the following tasks.

The process 600 includes operating (at 602) a photoreceptor.

The process 600 further includes activating (at 604) a mechanism (e.g., the actuator drive assembly 120 of FIGS. 1A-1C) that moves an actuator (e.g., 118) of a cartridge from a first actuator position to a second actuator position. The actuator in the first actuator position sets a toner transfer modulator in a first physical position and causes the toner transfer modulator in the first physical position to disrupt a transfer of a toner to the photoreceptor or a transfer member. The actuator in the second actuator position sets the toner transfer modulator in a different second physical position and causes the toner transfer modulator in the second physical position to allow a normal transfer of the toner to the photoreceptor or the transfer member.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A cartridge for an image forming device, the cartridge comprising:
- a developing device including a developing roller and a moveable support to be moved by an actuator of the image forming device;
- a photoreceptor on which an electrostatic latent image is formed;
- a toner transfer modulator linked to the moveable support and moveable between a first position to disrupt the transfer of the toner to the photoreceptor during an image forming operation of the image forming device and a second position to allow transfer of the toner to the photoreceptor or the transfer member by the actuator of the image forming device.

2. The cartridge of claim 1, wherein the toner transfer modulator comprises a light shutter, and wherein the first position of the toner transfer modulator corresponds to a blocking position of the light shutter that blocks light of a light source from reaching the photoreceptor during the image forming operation.

3. The cartridge of claim 2, wherein in the blocking position the light shutter is to block the light of the light source from reaching an entirety or a specified portion of an image forming surface of the photoreceptor.

4. The cartridge of claim 2, wherein the moveable support is to move the toner transfer modulator to a second position to allow a normal transfer of the toner to the photoreceptor or the transfer member during a further image forming operation of the image forming device.

5. The cartridge of claim 2, wherein the light source is to form an electrostatic latent image on a surface of the photoreceptor.

6. The cartridge of claim 1, wherein the toner transfer modulator comprises a diverter to redirect a portion of the toner off a surface of the photoreceptor after transfer of the toner from the developer to the photoreceptor and prior to transfer of the toner from the photoreceptor to the transfer member.

7. The cartridge of claim 6, wherein the first position of the toner transfer modulator corresponds to an engaged position of the diverter in which the diverter is positioned to physically redirect the portion of the toner off the surface of the photoreceptor.

8. The cartridge of claim 7, wherein in the engaged position the diverter is to divert the portion of the toner from a first part of the surface of the photoreceptor to a location away from the first part of the surface of the photoreceptor.

9. The cartridge of claim 8, wherein the first part of the surface of the photoreceptor is to transfer a portion of the toner if present on the first part to a first segment of the transfer member, the first segment of the transfer member within a range of a sensor that detects presence of any toner on the first segment of the transfer member.

10. The cartridge of claim 1, wherein the toner transfer modulator comprises a diverter to redirect a portion of the toner off a surface of the developer to a different location.

11. The cartridge of claim 1, wherein the toner transfer modulator comprises a diverter to redirect a portion of the toner off a surface of a transfer member wherein the toner on the surface of the transfer member was transferred from the photoreceptor to the transfer member.

12. A cartridge for an image forming device, the cartridge comprising:
- a developing device including a developing roller and a moveable support to be moved by an actuator moveable between different positions by a drive assembly of the image forming device during an image forming operation of the image forming device;
- a photoreceptor on which an electrostatic latent image is formed; and
- a toner transfer modulator linked to the moveable support and moveable, in response to a movement of the actuator, in the image forming device between a first position and a second position to control a transfer of a toner to a photoconductive drum or a transfer member,
- wherein the toner transfer modulator when in the first position disrupts the transfer of the toner to the photoconductive drum or the transfer member during the image forming operation of the image forming device, and
- wherein the toner transfer modulator when in the second position allows for a normal transfer of the toner to the photoconductive drum or the transfer member during the image forming operation of the image forming device.

13. The cartridge of claim 12, wherein the toner transfer modulator comprises:
- a light shutter, wherein the first position of the toner transfer modulator corresponds to a blocking position of the light shutter that blocks light of a light source from reaching the photoconductive drum during the image forming operation, and/or
- a first diverter, wherein the first position of the toner transfer modulator corresponds to an engaged position of the first diverter that redirects a portion of the toner off a surface of the photosensitive drum after transfer of the toner from the developing roller to the photosensitive drum and prior to transfer of the toner from the photosensitive drum to the transfer member, and/or
- a second diverter, wherein the first position of the toner transfer modulator corresponds to an engaged position of the second diverter that redirects a portion of the toner off a surface of the transfer member after transfer of the toner from the photosensitive drum to the transfer member, and/or
- a third diverter, wherein the first position of the toner transfer modulator corresponds to an engaged position of the third diverter that redirects a portion of the toner off a surface of the developing roller after transfer of the toner to the developing roller and prior to transfer of the toner from the developing roller to the photosensitive drum.

14. A method comprising:
- during an image forming operation of an image forming device to form an image on a target medium:
  - operating a photoreceptor; and
  - activating a mechanism that moves a moveable support by an actuator of a cartridge from a first position to a second position, wherein the first position sets a toner transfer modulator linked to the moveable support and in a first physical position and causes the toner transfer modulator in the first physical position to disrupt a transfer of a toner to the photoreceptor or a transfer member, and wherein the second actuator position sets the toner transfer modulator in a different second physical position and causes the toner transfer modulator in the second physical position to allow a normal transfer of the toner to the photoreceptor or the transfer member.

15. The method of claim 14, wherein the toner transfer modulator comprises:
- a light shutter, wherein the first physical position of the toner transfer modulator corresponds to a blocking position of the light shutter that blocks light of a light source from reaching the photoreceptor during the image forming operation, and/or
- a first diverter, wherein the first physical position of the toner transfer modulator corresponds to an engaged position of the first diverter that redirects a portion of the toner off a surface of the photoreceptor after transfer of the toner from a developer to the photoreceptor and prior to transfer of the toner from the photoreceptor to a transfer member, and/or
- a second diverter, wherein the first physical position of the toner transfer modulator corresponds to an engaged position of the second diverter that redirects a portion of the toner off a surface of the transfer member after transfer of the toner from the photoreceptor to the transfer member, and/or
- a third diverter, wherein the first position of the toner transfer modulator corresponds to an engaged position of the third diverter that redirects a portion of the toner off a surface of the developer after transfer of the toner to the developer and prior to transfer of the toner from the developer to the photoreceptor.

* * * * *